United States Patent [19]

Sasaki

[11] Patent Number: 4,951,226

[45] Date of Patent: Aug. 21, 1990

[54] CHARACTER DISPLAY DEVICE WITH REVERSING AND UNDERLINING EFFECTS

[75] Inventor: Ryoichi Sasaki, Nagoya, Japan

[73] Assignee: Brother Kogyo Kabushiki Kaisha, Japan

[21] Appl. No.: 317,954

[22] Filed: Mar. 2, 1989

[30] Foreign Application Priority Data

Mar. 7, 1988 [JP] Japan .................................. 63-53327

[51] Int. Cl.[5] ......................... G06F 15/20; G06F 9/00

[52] U.S. Cl. .................................... 364/518; 364/521; 340/747; 400/70

[58] Field of Search ............... 364/518, 521, 519, 523; 340/750, 747; 400/83, 63, 70, 72, 76

[56] References Cited

U.S. PATENT DOCUMENTS 4,737,922 4/1988 Ogasawara et al. ................ 364/519
4,831,554 5/1989 Storace et al. ...................... 364/519
4,837,712 6/1989 Shibamiya ........................... 364/523

*Primary Examiner*—Gary V. Harkcom
*Assistant Examiner*—Phu K. Nguyen
*Attorney, Agent, or Firm*—Oliff & Berridge

[57] ABSTRACT

A dot-matrix character display device for displaying characters normally and in reverse, in which, the underline segment of the dot-matrix display of a reversed, underlined character is not reversed (i.e., the underline segment dots are displayed). When a character without an underline is reversed, the underline segment is not reversed (i.e., the underline segment dots are not displayed). This ensures more natural visual recognition of underlined or non-underlined characters even when normal and reversed characters are intermingled.

2 Claims, 4 Drawing Sheets

CHARACTER DISPLAY DEVICE WITH REVERSING AND UNDERLINING EFFECTS

BACKGROUND OF THE INVENTION

This invention relates to a character display device for displaying some characters in reverse to indicate some printing effects such as boldface, or for block-editing text.

The character display device of this type has a display, such as a cathode-ray tube (CRT) display, a liquid-crystal panel, an electroluminescent (EL) panel, or a plasma display. It typically displays characters with a dot matrix. When the number of dots for each character is limited, a character with printing effects such as boldfacing, shadowing and striking-out can not be displayed as it is. Instead, those enhanced characters are displayed in reverse on the monochromatic display.

In these display devices, an underline is displayed at the bottom of the character region. If the reversed character has an underline, the underline is also reversed, which causes a problem. As shown in FIG. 5A, when an enhanced character (e.g., a boldface character) with an underline is reversed ("I" and "T"), the underline of the reversed characters is not displayed. If these characters are placed between normal (unenhanced) characters with an underline, the underline appears interrupted. This produces a display image different from the printing image. On the other hand, as shown in FIG. 5B, when an enhanced character without an underline is reversed, an unnecessary underline is displayed under the reversed character, resulting in confusion over whether it is underlined. That is, in these cases, visual recognition of an underline is difficult while editing a text.

SUMMARY OF THE INVENTION

An object of the invention is, therefore, to appropriately display characters with an enhancement and an underline on such a character display device.

The character display device according to the present invention comprises: a monochrome, bit-map display panel; a display memory for storing bit-map image data corresponding to the structure of display panel; a character-pattern memory for storing bit-map character-pattern data for a plurality of characters; a normal display driver that reads out character-pattern data from the character-pattern memory in response to externally provided character-code data, and sends the character-pattern data to the display memory; an underlining means for putting an underline at a bottom portion of the bit-map image in the display memory in response to an externally provided underlining command; a first reversing means for reversing the bit-map image data in the display memory in response to an externally provided reversing command; and a second reversing means for reversing the bit-map image data except the bottom portion in the display memory when both the underline command and the reverse command are externally provided.

DETAILED DESCRIPTION OF A PREFERRED EMBODIMENT

Figure 1:
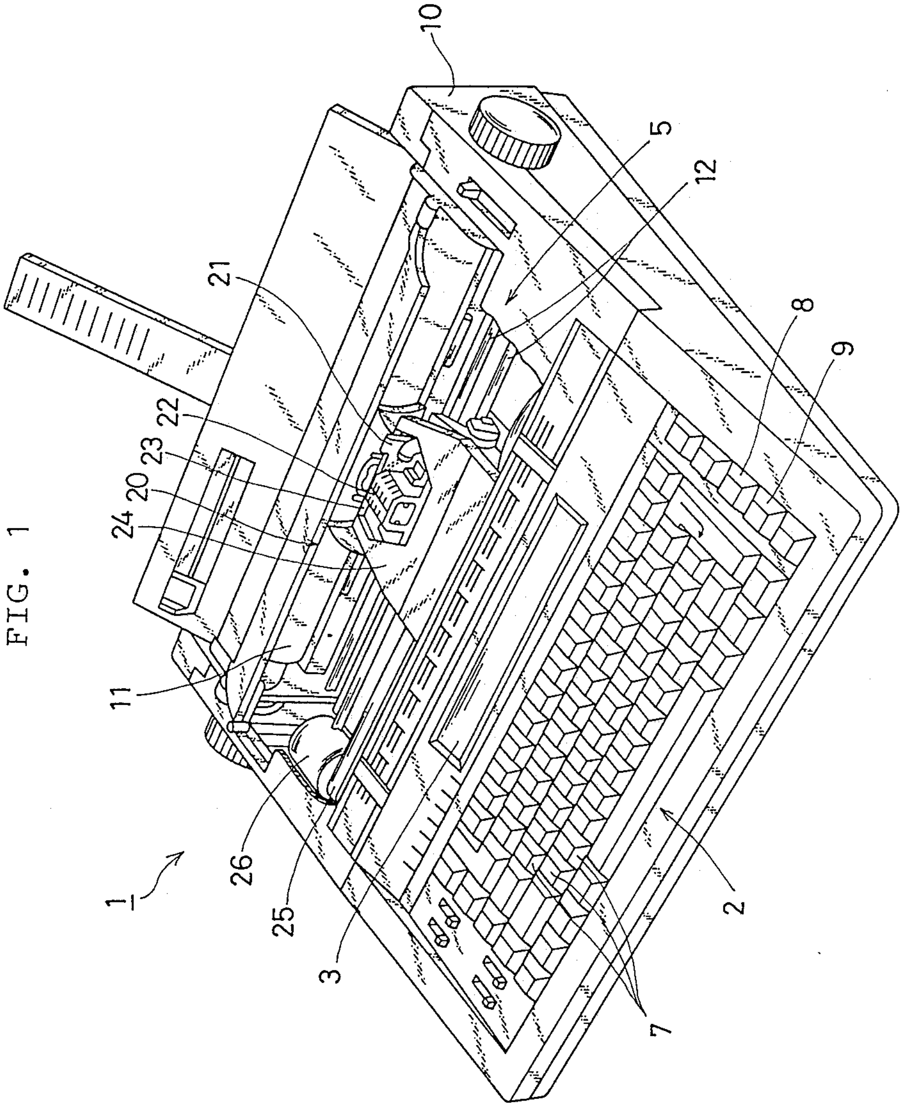
FIG. 1 is a perspective view of an electronic typewriter with a character display device of the present invention.

An electronic typewriter 1 shown in FIG. 1 includes a keyboard 2, a liquid crystal display (LCD) panel 3, and a printer 5. The keyboard 2 includes: character keys 7; an underline key 8 for setting and resetting an auto-underlining mode to automatically underline characters; and a bold key 9 for setting and resetting a bold mode to make characters boldfaced.

The LCD panel 3 is a one-line, 24-character display that displays data received from the keyboard 2, or that displays information to an operator from the electronic typewriter 1. Each character region of the LCD panel 3 is composed of eight-row-by-six-column dot matrix. The character regions are continuous, so that an edge column is reserved for character separation. The bottom row is reserved for an underline.

The printer 5 includes: a platen 11 at the rear of a typewriter body 10; a pair of guide bars 12 parallel to the platen 11; and a carriage 13 that moves on the guide bars 12. The carriage 13 has a printing portion 20 composed of: a type-wheel cassette 21 for housing a daisy-wheel type set (not shown); a printing hammer 22 for striking a type of the daisy-wheel; and a ribbon cassette 24 for housing a printing ribbon 23. The carriage 13 is driven by a stepping motor 26 via a cogged belt 25.

Figure 2:
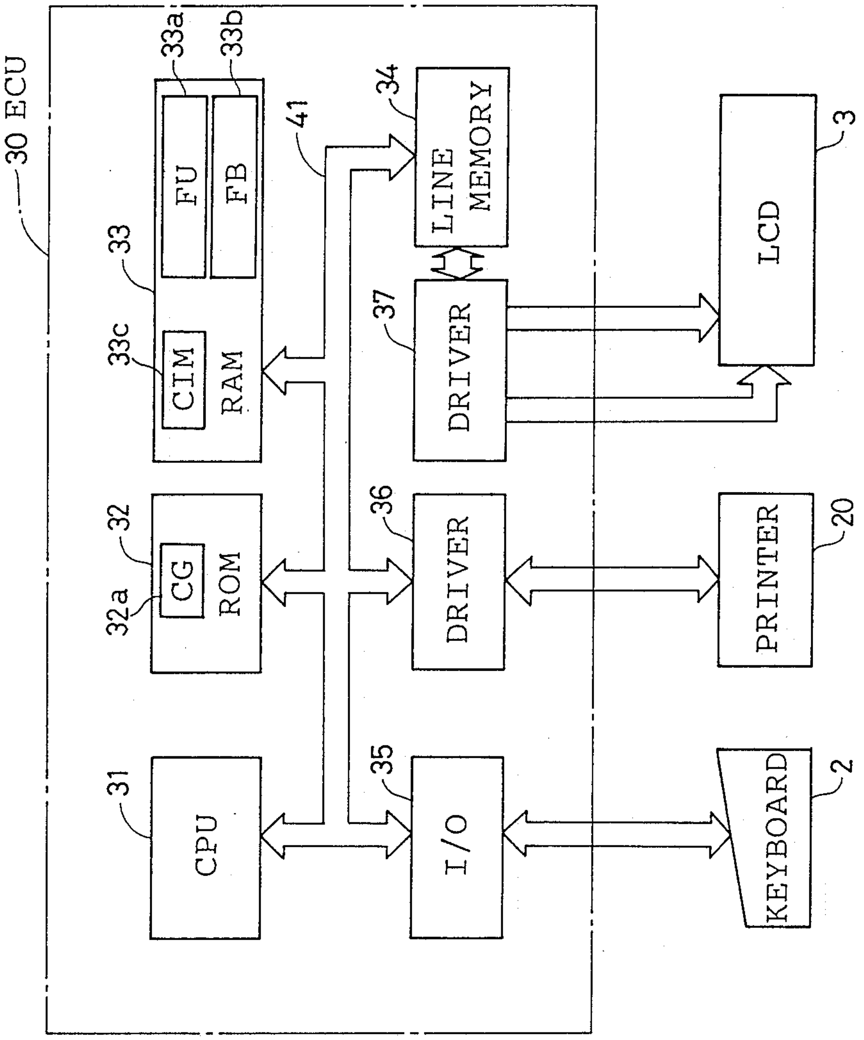
FIG. 2 is an electrical block diagram of the embodiment.

As shown in FIG. 2, an electronic control unit (ECU) 30 within the body 10 connects to the keyboard 2, the LCD panel 3 and the printing portion 20. The ECU 30 is a logic circuit including: a central processing unit (CPU) 31; a read-only memory (ROM) 32; a random-access memory (RAM) 33; and a line memory 34 for storing one line of characters displayed on the LCD panel 3 with their dot patterns. The ROM 32 stores control programs and includes a character pattern generator **32*a*. The RAM 33 includes an underline flag (FU) region 33*a*, a bold flag (FB) region 33*b* and a character image memory region 33*c*. The CPU 31 processes character data and control data input from the keyboard 2 according to the programs in the ROM 32**, and executes displaying and printing processes.

Specifically, the CPU 31 executes the following processes. First, it receives character data or control data from the keyboard 2 via a keyboard input/output (I/0) circuit 35, and stores the data in the RAM 33. Character data, as well as message data generated by the typewriter system, is stored in the RAM 33 as character-code data, and the CPU 31 converts the character-code data into character-pattern data, which is stored once in the character image region **33*c* and then in the line memory 34. The character-pattern data (bit-map data) in the line memory 34 corresponds to the dot-matrix structure of the LCD panel 3, so it is directly displayed on the LCD panel 3 by an LCD driver circuit 37. The CPU 31 also prints out the text data in the RAM 33 by controlling the stepping motor 26 and the printing portion 20**.

The typewriter 1 can print characters with various printing effects, for example, boldface and underlining. A boldface character is printed by the printer 5 by printing the same type twice with a slight shift. Since the LCD panel 3 has only limited number of dots for displaying a character, a boldface character is displayed in reverse on the LCD panel 3.

Figure 3:
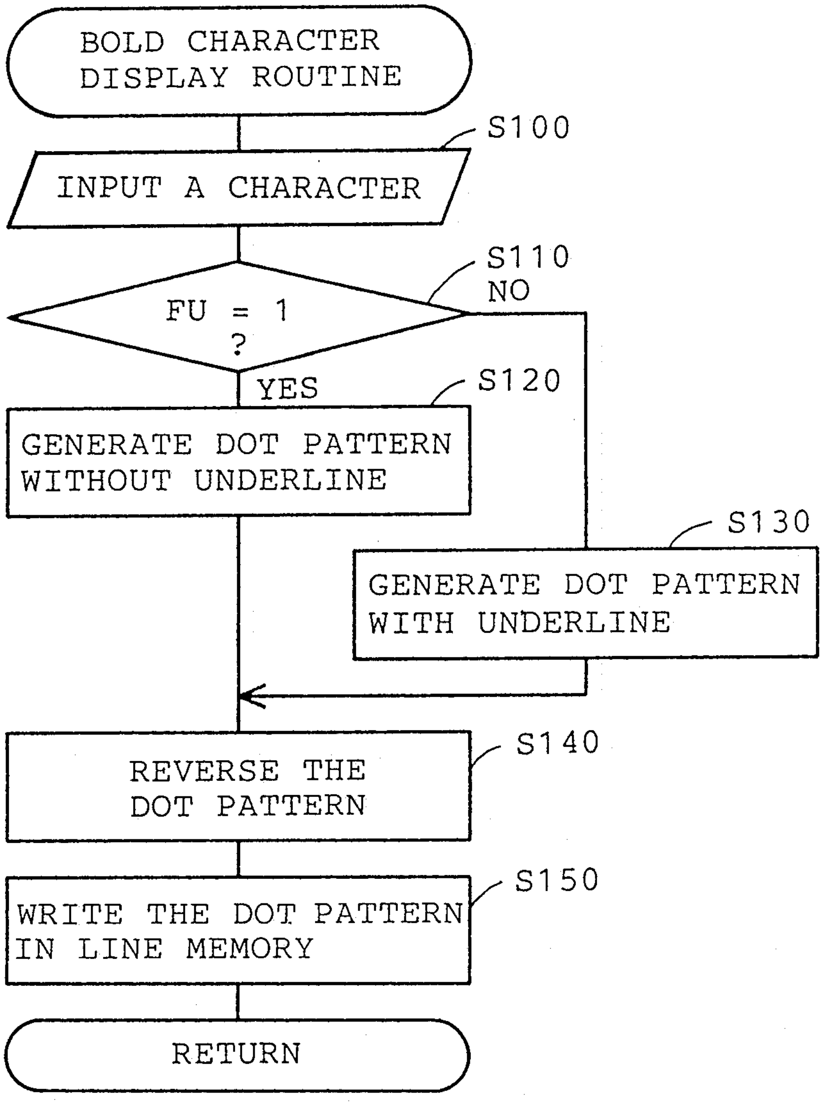
FIG. 3 is a flow chart illustrating a bold-character display routine of the embodiment.

The bold-character display routine, in which a character with the bold enhancement is reversed, is explained in reference with a flow chart of FIG. 3.

When the bold key 9 is pressed, the bold flag FB **33*b* is set and the routine starts. At step S100, a character is input on the keyboard 2. At step S110, it is determined, based on the underline flag FU 33*a*, whether the autounderlining mode is set (FU=1). The underline flag FU 33*a* is set when the underline key 8 is pressed. If the underline flag FU 33*a* is set, the character pattern corresponding to the character received at step S100 is read from the ROM 32 at step S120. The character pattern is for the normal (i.e., without a bold effect) character. Further, at this step S120, although the underline flag FU 33*a* is set, the character pattern is not underlined (i.e., the dot pattern for the character without an underline is generated). On the other hand, if the underline flag FU 33*a* is not set at step S110, the character pattern corresponding to the input character is read from the ROM 32, and the dot pattern with an underline is generated at step S130**.

After the both steps S120 and S130, the dot pattern is reversed at step S140 and is written in the line memory 34 at step S150. Then the routine ends.

Figure 4A:
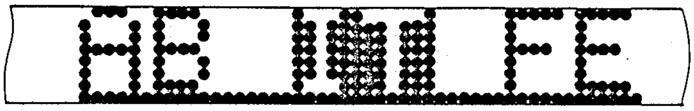
FIGS. 4A and 4B are examples of characters displayed on the panel according to the invention.
Figure 4B:
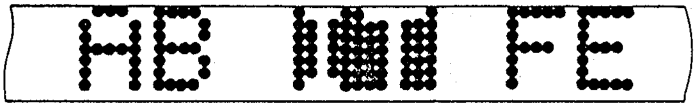
Figure 5A:
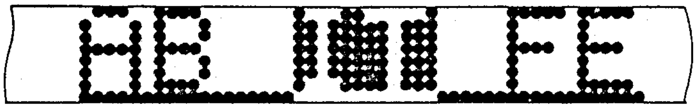
FIG. 5A PRIOR ART
FIGS. 5A and 5B are examples of characters displayed on the panel according to the prior art.
Figure 5B:
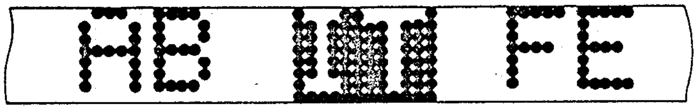
FIG. 5B PRIOR ART

As explained above, in displaying a boldface character with an underline, first a normal character pattern without an underline is made, and then it is reversed. In displaying a boldface character without an underline, first a normal character pattern with an underline is made, and then it is reversed. FIG. 4A shows a display example of underlined characters ("AB IT FE") with "IT" in boldface according to the present invention. FIG. 4B shows a display example of the same characters without an underline. In this way, even when an enhanced character, such as a boldface character, is displayed in reverse, its underline is not reversed. Therefore, underlines of characters including any reversed characters is continuously displayed. Further, as shown in FIG. 4B, no confusing underline portion is displayed when a boldface character is displayed in reverse. These innovations ensure natural recognition of underlined or nonunderlined characters even when normal and reversed characters are intermingled.

In this embodiment, only the underline is operated in reverse, so the process is simple, and the programs for prior-art electronic typewriters could easily be modified.

Moreover, the character display device of the embodiment may be used to display other enhanced characters in reverse in addition to the boldface characters. The present invention may also be used when whole words or sentences are displayed in reverse for some block operations in the editing process of a word processor.

Many modifications and variations of the present invention are possible in the light of the above teachings. It is therefore to be understood that the scope of this invention is limited only by the appended claims.

WHAT IS CLAIMED IS:

1. A display device comprising:

a monochrome, bit-map display panel for displaying a character by a dot-matrix including an underline portion;

a display memory for displaying bit-map character-pattern data corresponding to the structure of the display panel;

a character-pattern memory for storing bit-map character-pattern data for a plurality of characters;

means for receiving externally provided character code-data;

means for receiving an externally provided reversing command;

a control means for reading out bit-map character-pattern data from the character-pattern memory in response to externally provided character-code data, for reversing the bit-map character-pattern data read out from the character-pattern memory except the underline portion in response to an externally provided reversing command, and for sending the character-pattern data to the display memory.

2. A display device comprising:

a monochrome, bit-map display panel for displaying a character by a dot-matrix including an underline portion;

a display memory for storing bit-map character-pattern data corresponding to the structure of the display panel;

a character-pattern memory for storing bit-map character-pattern data for a plurality of characters;

means for receiving externally provided character-code data;

means for receiving an externally provided underlining command;

means for receiving an externally provided reversing command;

a display controller for reading out bit-map character-pattern data from the character-pattern memory in response to externally provided character-code data, writing the bit-map character-pattern data in a character image memory and sending the bit-map character-pattern data in the character-pattern image memory to the display memory;

an underlining means for not putting an underline at the underline portion of the bit-map character-pattern data in the character image memory in response to an externally provided underlining command, and for putting an underline at the underline portion when no underlining command is provided; and a reversing means for reversing the bit-map character-pattern data in the character image memory in response to an externally provided reversing command.

* * * * *